(12) United States Patent
Mi (10) Patent No.: US 8,613,540 B1
(45) Date of Patent: Dec. 24, 2013

(54) LIGHT GUIDE PLATE HAVING A REVERSED MICRO-PATTERN IN ITS MIXING ZONE

(75) Inventor: Xiang-Dong Mi, Northborough, MA (US)

(73) Assignee: SKC Haas Display Films Co., Ltd., Choongchungnamdo (KR)

(*) Notice: Subject to any disclaimer, the term of this patent is extended or adjusted under 35 U.S.C. 154(b) by 0 days.

(21) Appl. No.: 13/494,931

(22) Filed: Jun. 12, 2012

(51) Int. Cl.
 *F21V 7/04* (2006.01)
(52) U.S. Cl.
 USPC ............................................ 362/606; 362/607

(58) Field of Classification Search
 USPC ................................................................ 362/606
 See application file for complete search history.

(56) References Cited

U.S. PATENT DOCUMENTS

7,097,341 B2  8/2006  Tsai
8,111,969 B2  2/2012  Lee et al.

*Primary Examiner* — Donald Raleigh
(74) *Attorney, Agent, or Firm* — Edwin Oh (57) ABSTRACT

The present invention provides a light guide plate having reduced hot spots comprising an input surface for receiving light from a plurality of discrete light sources, an output surface for emitting light, a bottom surface opposing to the output surface, and an end surface opposing to the input surface.

7 Claims, 8 Drawing Sheets

$$D = 2\sqrt{R^2 - (R-H)^2}$$

LIGHT GUIDE PLATE HAVING A REVERSED MICRO-PATTERN IN ITS MIXING ZONE

FIELD OF THE INVENTION

This invention generally relates to a light guide plate, and more particularly, to a light guide plate having a reversed one- or two-dimensional micro-pattern in its mixing zone to reduce undesirable hot spot defects caused by discrete light sources.

BACKGROUND OF THE INVENTION

Liquid crystal displays (LCDs) continue to improve in cost and performance, becoming a preferred display type for many computer, instrumentation, and entertainment applications. Typical LCD-based mobile phones, notebooks, and monitors include a light guide plate (LGP) for receiving light from a light source and redistributing the light uniformly across the light output surface of the LGP. The light source, conventionally being a long, linear cold-cathode fluorescent lamp, has evolved to a plurality of discrete light sources such as light emitting diodes (LEDs). For a given size LCD, the number of LEDs has been steadily decreasing to reduce cost. Subsequently, the pitch of the LEDs has become larger, which results in a more noticeable hot spot problem, that is, more light is distributed near each LED than between LEDs in the first few millimeters of the viewing area of the LCD. The hot spot problem occurs because light from the discrete LEDs enters the LGP non-uniformly, that is, more light is distributed near the LEDs than between the LEDs.

Many LGPs have been proposed to suppress the hot spot problem. Some LGPs have continuous grooves near their edge such as the ones disclosed in U.S. Pat. No. 7,097,341 (Tsai). Some LGPs have two sets of linear grooves of different pitches on their light output surface, some LGPs have two or more sets of dots of different sizes, and others may have both grooves and dots of different sizes.

While the prior art LGPs are capable of suppressing the hot spot problem to a certain degree, they are still not satisfactory due to the complexity in the mass production of those LGPs. Thus, there remains a need for a light guide plate that can be easily made and is capable of suppressing the hot spot problem.

SUMMARY OF THE INVENTION

The present invention provides a light guide plate having reduced hot spots comprising an input surface for receiving light from a plurality of discrete light sources, an output surface for emitting light, a bottom surface opposing to the output surface, and an end surface opposing to the input surface, wherein the direction from the input surface to the end surface is defined as Y-axis, the direction that is perpendicular to the Y-axis and parallel to the discrete light sources is defined as X-axis, the output surface has a plurality of elongated grooves running parallel to the Y-axis and extending from the input surface corresponding to $Y=0$ to the end surface, the bottom surface has a core zone extending from a predetermined line corresponding to $Y=Y_1$ to the end surface and a mixing zone extending from $Y=0$ to $Y=Y_1$; and a set of lenses are distributed in the core zone and a set of micro-lenses distributed in the mixing zone between $Y=Y_0$ and $Y=Y_1$, wherein the density of the set of micro-lenses varies in the X-axis, having a maximum value at a first location that has a same X value as the center of one of the discrete light sources, and having a minimum value at a second location that has a same X value as the center of two adjacent discrete light sources, and the selected size and the density of the micro-lenses redirect the light from the discrete light sources toward the Y-axis and the ratio $L_1/L_0$ is between 0.9 and 1.1 for any $Y \geq Y_1$.

BRIEF DESCRIPTION OF THE DRAWINGS

FIG. 1H-1 to 1H-3 compares hot spot contrast between the reverse and normal hot spot problems;

DETAILED DESCRIPTION OF THE INVENTION

Figure 1A:
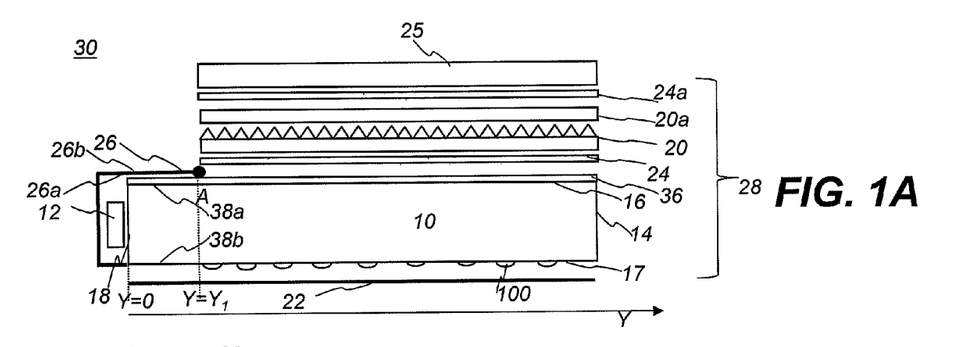
FIG. 1A shows a side view of an LCD comprising a plurality of optical components including a prior light guide plate.

FIG. 1A shows schematically a side view of an LCD display apparatus 30 comprising an LCD panel 25 and a backlight unit 28. Backlight unit 28 comprises a plurality of optical components including one or two prismatic films 20, 20a, one or two diffusive films 24, 24a, a bottom reflective film 22, a top reflective component 26, and a light guide plate (LGP) 10. LGP 10 is different from the other optical components in that it receives the light emitted from one or more light sources 12 through its input surface 18, redirects the light emitted through its bottom surface 17, end surface 14, output surface 16, side surfaces 15a, 15b (not shown) and reflective film 22, and eventually provides light relatively uniform to the other optical components. Output surface 16 has a plurality of elongated grooves 36. Target luminance uniformity is achieved by controlling the density, size, and/or orientation of the lenses 100 (sometimes referred to as discrete elements, or light extractors) on the bottom surface 17. The top reflective component 26 typically covers the LGP 10 for about 2 to 5 millimeters from the light input surface to allow improved mixing of light. The top reflective component 26 has a highly reflective inner surface 26a. Top reflective component 26 may have a black outer surface 26b, and is therefore referred to as "black tape". Top reflective component 26 may also be any known reflector rather than a black tape. Typically the luminance of a backlight is evaluated from point A, which is at the end of top reflective component 26, and proceeds through the viewing area to the opposite end of the LGP. LGP 10 has a first direction Y that is parallel to its length direction, and a second direction X (shown in FIG. 1B) that is parallel to its width direction. On both output surface 16 and bottom surface 17, the area between the input surface (Y=0) of LGP 10 and line Y=$Y_1$ (passing through Point A) is often referred to as the mixing zone. The mixing zone consists of a top mixing zone 38a and a bottom mixing zone 38b. The length between Y=0 and Y=$Y_1$ is referred to as the length of the mixing zone. The viewing area between line Y=$Y_1$ and end surface 14 is referred to as the core zone. In mixing zone 38b on bottom surface 17, prior LGPs typically do not have any microlenses. When prior LGPs do have micro-lenses on (bumps) or in (holes) bottom mixing zone 38b to reduce the hot spot problem, the micro-lenses typically have a two-dimensional density distribution and the density of the two-dimensional micro-lenses is higher at the center distance between two adjacent light sources than at the center of each light source.

Figure 1B:
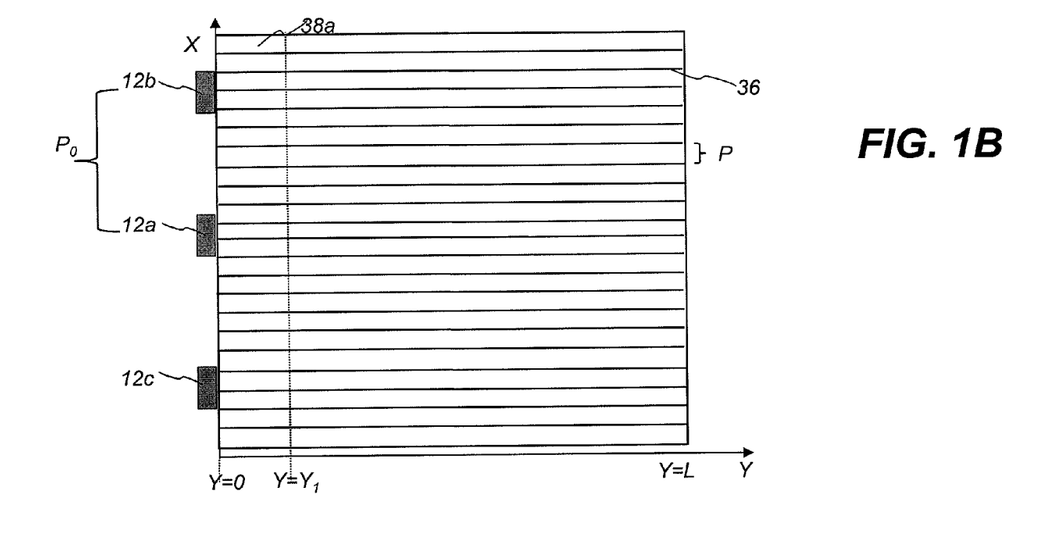
FIG. 1B shows a top view of the prior light guide plate.

FIG. 1B shows a top view of elongated grooves 36 on output surface 16. Elongated grooves 36 extend from the beginning (Y=0) of LGP 10 to the end (Y=L) of LGP 10, where L is the length of LGP 10. As such, elongated grooves 36 extend through mixing zone 38a which is on the top or output surface. Elongated grooves 36 have a pitch P and are parallel within ±5° to the length direction of LGP 10. However, elongated grooves 36 need not have a regular pitch. Also shown in FIG. 1B are three exemplary light sources 12a, 12b, 12c, corresponding to the light source 12 shown in FIG. 1A. Light sources 12a, 12b and 12c have a pitch of $P_0$.

Figure 1C:
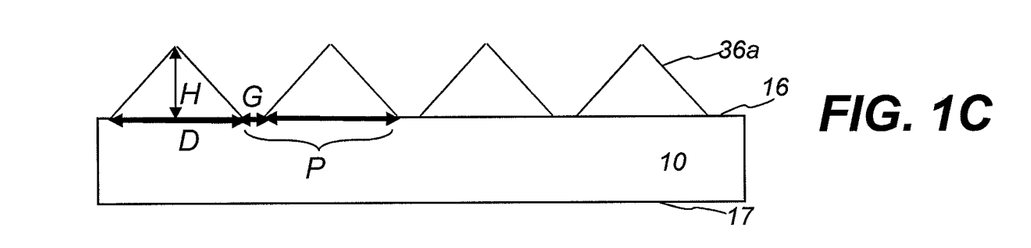
FIG. 1C shows that the prior light guide plate has prismatic grooves on its light output surface.
Figure 1D:
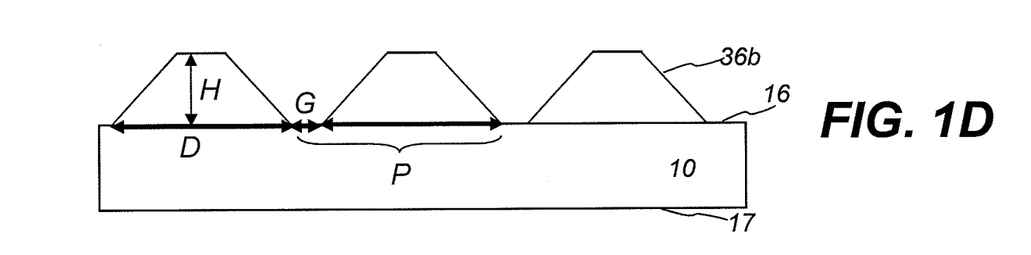
FIG. 1D shows that the prior light guide plate has trapezoidal grooves on its light output surface.
Figure 1E:
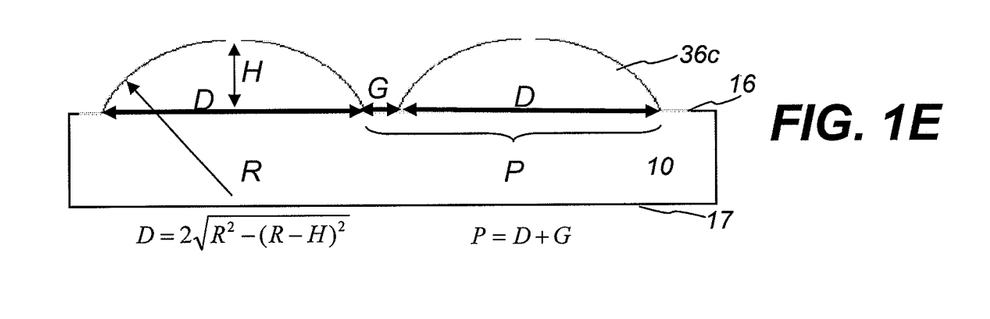
FIG. 1E shows that the prior light guide plate has lenticular lenses on its light output surface.

Elongated grooves 36 can be prismatic grooves 36a as shown in FIG. 1C, trapezoidal grooves 36b as shown in FIG. 1D, or lenticular lenses 36c as shown in FIG. 1E. Each of the features has a height H, a width D, a pitch P, and a gap G, where the pitch P=D+G. The gap G varies from 0 to 2D. When gap G=0, the elongated grooves are closely packed. Elongated grooves may take other known shapes such as rounded prisms, prisms that vary in height along their length and the like.

Prior art LGP 10 has some advantages in having elongated grooves 36 on its output surface 16. For example, elongated grooves 36 may hide cosmetic defects from lenses 100 on bottom surface 17. However, prior art LGP 10 suffers from a hot spot problem. For example, when the pitch P of light sources 12 is 6.6 millimeters (mm), the mixing zone length is 4 millimeters, and elongated grooves 36 are lenticular lenses 36c having a height, H=11 microns, a width, D=50 microns, and a gap, G=0, the hot spot extends well into the viewing area. The hot spot is still visible at Y=7 millimeters. Thus prior art LGP 10 having elongated grooves on its output surface does not provide uniform luminance in the viewing area.

Figure 1F:
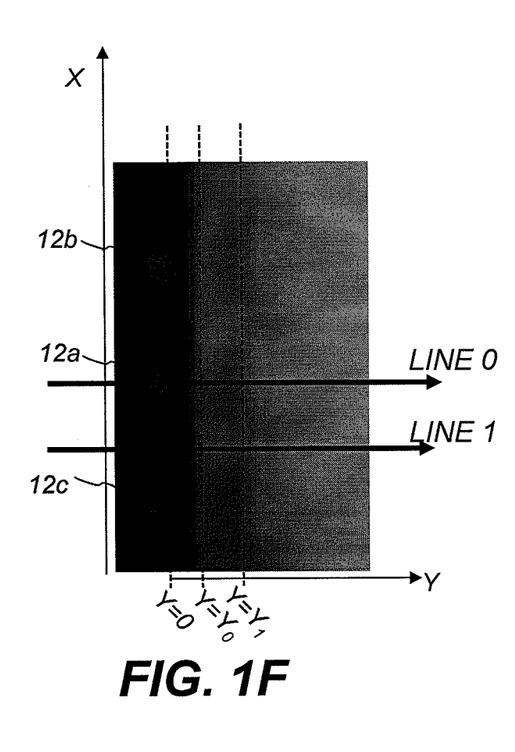
FIG. 1F shows an image of a reverse hot spot problem resulted from the prior light guide plate.
Figure 1G:
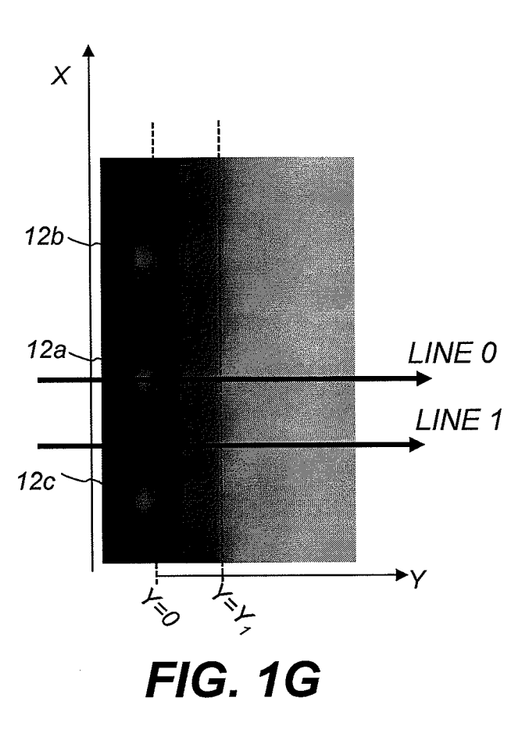
FIG. 1G shows an image of a normal hot spot problem resulted from another prior light guide plate.
Figure 1H:
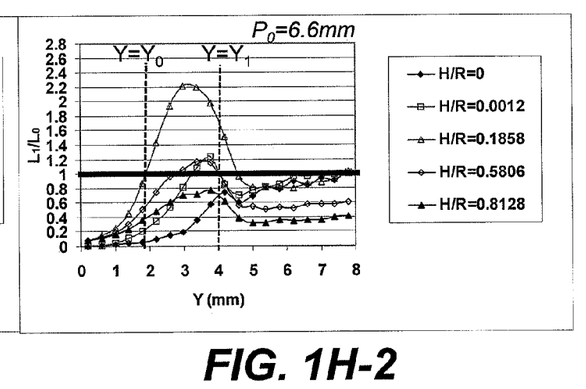
Figure 1H:
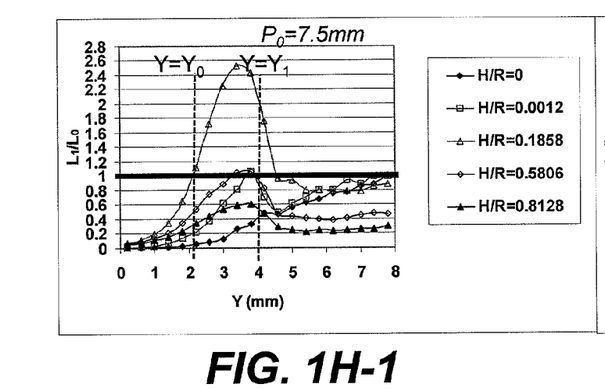
Figure 1H:
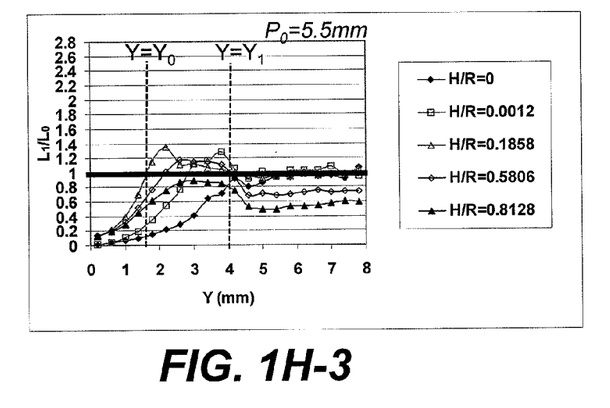

FIG. 1F shows an image of a reverse hot spot problem resulting from prior art light guide plate 10 having elongated grooves 36 on its output surface 16 and having no microlenses in the bottom mixing zone. FIG. 1G shows an image of a normal hot spot problem resulting from another prior art light guide plate that is the same as light guide plate 10 without elongated grooves 36 on its output surface 16.

A comparison between FIG. 1F and FIG. 1G reveals that the hot spot problems are clearly different for light guide plates with (see FIG. 1F) and without (see FIG. 1G) elongated grooves on their output surface. When the light guide plate does not have elongated grooves on its output surface (see FIG. 1G), the light flux $L_0$ along a line that passes through the center of a light source and extends along the Y-axis such as LINE 0 is always higher than the light flux $L_1$ along a line that passes midway between the center of two adjacent light sources and extends along the Y-axis such as LINE 1, for Y between $Y_0$ and $Y_1$. This first type of hot spot will be referred to as "normal" hot spot hereinafter. The normal hot spot has been the target of prior hot spot reduction methods.

In comparison, when the light guide plate has elongated grooves on its output surface (see FIG. 1F), the light flux $L_0$ along LINE 0 is lower than the light flux $L_1$ along LINE 1 in at least an area defined between line Y=$Y_0$ and line Y=$Y_1$. This second type of hot spot will be referred to as "reverse" hot spot hereinafter.

FIG. 1H-1 further explains why the reverse hot spot problem occurs when lenticular lenses are added to the output surface of a light guide plate. In this study, the light guide plates all have a mixing zone of 4 mm; the same size microlenses, 66 micrometers (μm) in width, are distributed in the core zone. The core zone extends from the end of the mixing zone, Y=4 mm, to the end surface. The light guide plates accept light from discrete light sources. The discrete light sources have a pitch of 7.5 mm, and an emission width of about 2.5 mm. No micro-lenses are located in the mixing zone. The lenticular lenses 36c in top mixing zone 38a on output surface 16 all have the same radius R=43.0625 μm and gap G=0 (See FIG. 1E for definitions). The light guide plates differ by the height H of lenticular lenses 36c on its output surface 16.

FIG. 1H-1 shows plots of the hot spot ratio $L_1/L_0$ for various H/R ratios, where H and R are the height and radius of lenticular lenses 36c. $L_0$ and $L_1$ are the emitted light flux measured at the output surface 16 along the centerline of the discrete light source 12, LINE 0, and the centerline between each light source 12, LINE 1, respectively. A normal hot spot is evident when the ratio $L_1/L_0$<1. The ratio $L_1/L_0$>1 indicates a reverse hot spot, and the ratio $L_1/L_0$=1 indicates equal flux along LINE 0 and LINE 1. In practice, when the ratio $L_1/L_0$ is between approximately 0.9 and 1.1, the hot spot may be acceptable depending upon the haze of diffusive films 24 and 24a. In other words, the normal hot spot is noticeable when the ratio $L_1/L_0$<0.9, while the reverse hot spot is noticeable when the ratio $L_1/L_0$>1.1. In the following, the reverse hot spot is considered to exist when the ratio $L_1/L_0$>1.1 for at least some Y between $Y_0$ and $2Y_1$, while the normal hot spot is considered to exist when $L_1/L_0$<0.9 for at least some Y between $Y_0$ and $2Y_1$.

FIG. 1H-1 further shows that when the ratio of the height of the lenticular lens to the radius of the lenticular lens equals zero, H/R=0, that is, there is no lenticular lens, the normal hot spot extends to about Y=7.5 mm into the light guide plate. When the H/R ratio increases to 0.0012 (or H=0.05 μm, H/D=0.0120), some portion of $L_1/L_0$ starts to exceed 1 for at least some Y between $Y_0$ and $2Y_1$. Note that $$\frac{H}{D} = \frac{1}{2\sqrt{\frac{2R}{H} - 1}},$$

and D is the size of the lenticular lens as shown in FIGS. 1C through 1E. When the H/R ratio increases to 0.1858 (or H=8 μm, H/D=0.1600), $L_1/L_0$ exceeds 1 for Y between $Y_0$ and $Y_1$, where $Y_0$ is determined from $L_1/L_0$=1. As the H/R ratio increases further, the ratio $L_1/L_0$ becomes smaller. When the H/R ratio increases to 0.5806 (or H=25 μm, H/D=0.3298), the maximum of $L_1/L_0$ just exceeds 1 for at least some Y between $Y_0$ and $2Y_1$. When the H/R ratio further increases to 0.8128 (or H=35 µm, H/D=0.4137), $L_1/L_0$ is smaller than 0.6 for Y between 0 and 4 mm, and beyond. The curve for H/R=0 and the curve for HR=0.8128 are both examples of normal hot spot, where $L_1/L_0$<0.9 for some Y between $Y_1$ and $2Y_1$ and $L_1/L_0$<1.1 for any Y between 0 and $2Y_1$. The curve for H/R=0.0012 and the curve of HR=0.1858 are also examples of normal hot spot, where $L_1/L_0$<0.9 for some Y between $Y_1$ and $2Y_1$ and $L_1/L_0$<1.1 for any Y between 0 and $2Y_1$. The curve for H/R=0.1858 is an example of reverse hot spot because $L_1/L_0$>1.1 for some Y between 0 and $2Y_1$. More specifically, the curve for H/R=0.1858 shows normal hot spot for Y between 0 and $Y_0$, and for Y between about 5 mm and about 8 mm, and shows reverse hot spot for at least Y between $Y_0$ and $Y_1$.

FIG. 1H-2 and FIG. 1H-3 are identical to FIG. 1H-1 except that the pitch $P_0$ of the discrete light sources changes from 7.5 mm (in FIG. 1H-1), to 6.6 mm (in FIG. 1H-2), and to 5.5 mm (in FIG. 1H-3). The general conclusions for FIGS. 1H-2 and 1H-3 are the same as those for FIG. 1H-1. A comparison of FIGS. 1H-1 through 1H-3 shows the curves for the H/R ratio change with the pitch $P_0$ of the discrete light sources. For example, for the same H/R=0.1858, $Y_0$ varies from about 2.2 mm in FIG. 1H-1 to about 2.8 mm in FIG. 1H-2, and to about 1.6 mm in FIG. 1H-3. FIGS. 1H-1 through 1H-3 show that the reverse hot spot exists when a light guide plate has certain elongated grooves on its output surface extending from the input surface to the end surface. Even though the examples of reverse hot spot are given for lenticular lenses having a H/R ratio between about 0.0012 and 0.5806, it is conceivable that other types of elongated grooves, as shown in FIGS. 1C-1D, are also likely to cause reverse hot spot when their geometry, as defined by ratios such as H/R or H/D, is in a certain range.

Figure 2A:
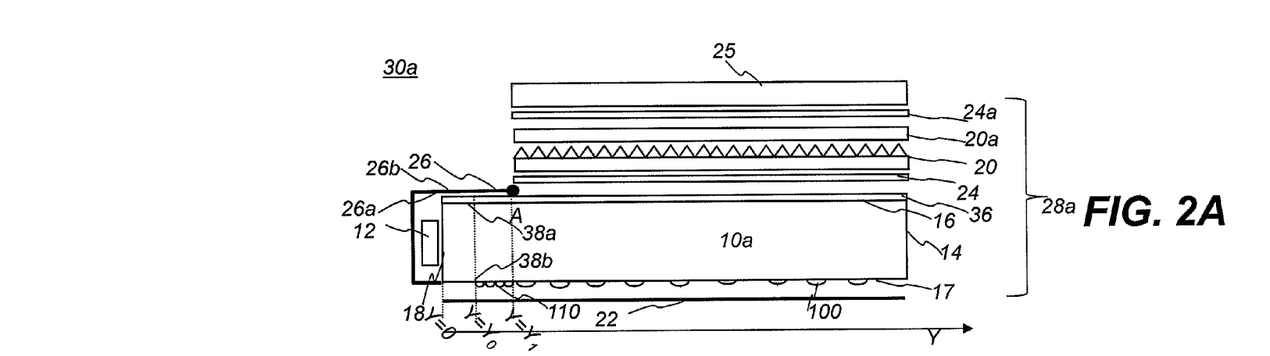
FIG. 2A shows a side view of an LCD comprising a plurality of optical components including a light guide plate of the present invention.

FIG. 2A shows schematically a side view of an LCD display apparatus 30a comprising an LCD panel 25 and a backlight unit 28a. Backlight unit 28a is the same as backlight unit 28 shown in FIG. 1A except that backlight unit 28a includes an LGP 10a which has micro-lenses 110 in the mixing zone 38b on its bottom surface 17, while backlight unit 28 includes LGP 10 which has no micro-lenses in the mixing zone 38b on its bottom surface 17.

Figure 2B:
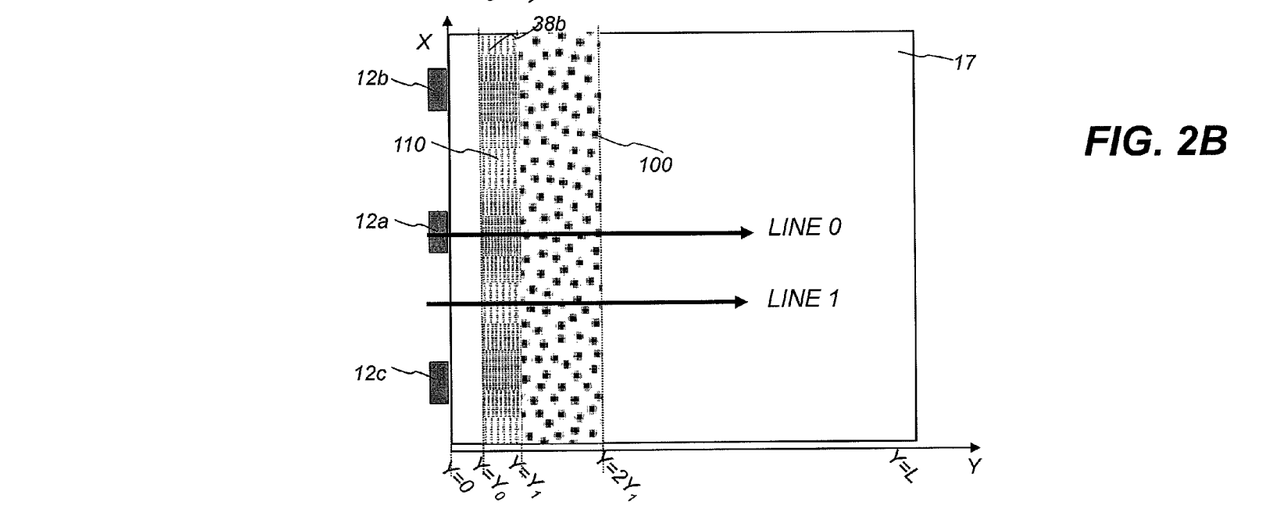
FIG. 2B shows a bottom view of the light guide plate of the present invention; a reversed micro-lens pattern is distributed in part of the mixing zone.

Referring to FIG. 2B, lenses 100 are distributed in the core zone for Y between $Y_1$ and L. For the purpose of illustration, only lenses 100 that are distributed in the core zone for Y between $Y_1$ and $2Y_1$ are shown. Lenses 100 shown have a size S1 and an area density D1 near $Y_1$. In comparison, micro-lenses 110 distributed in the bottom mixing zone 38b for Y between $Y_0$ and $Y_1$ have a size S2 and an area density D2. The area density D2 is either one-dimensional that varies with X or two-dimensional that varies with both X and Y. Additionally, the area density D2 is reversed relative to the position of the discrete light sources 12a, 12b, and 12c. More specifically, at a given Y, the density D2 has a maximum value at LINE 0 and a minimum value at LINE 1. Note again that LINE 0 passes through the center of a light source 12 and extends along the Y-axis, and LINE 1 passes through the center distance of two adjacent light sources and extends along the Y-axis.

Figure 2C:
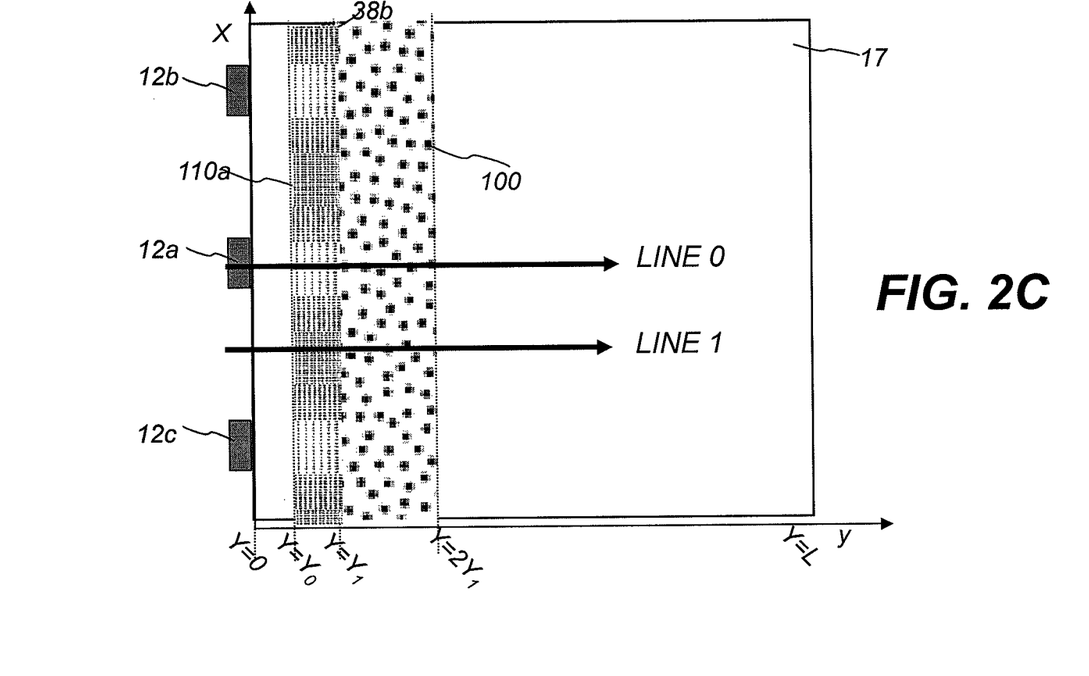
FIG. 2C shows a bottom view of a light guide plate according to a comparative example; a normal micro-lens pattern is distributed in part of the mixing zone.

In a normal hot spot situation, more light occurs along LINE 0 than along LINE 1; therefore a normal one- or two-dimensional area density is needed. The normal area density has a maximum value at LINE 1 and a minimum value at LINE 0. FIG. 2C shows micro-lenses 110a with a normal area density placed in the mixing zone in a prior light guide plate. The density of the micro-lenses 110a is the same as that of the micro-lenses 110 shown in FIG. 2B, except that the density of the micro-lenses 110a has a maximum value at LINE 1 and a minimum value at LINE 0 for a given Y whereas the density of micro-lenses 110 shown in FIG. 2B have a minimum value at LINE 1 and a maximum value at LINE 0 for a given Y.

Figure 3A:
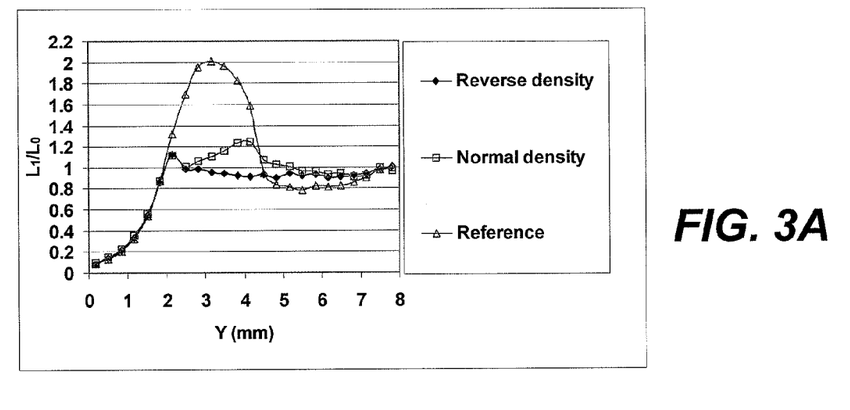
FIG. 3A shows a comparison of the simulated hot spot ratio among an inventive example and two comparative examples.
Figure 3B:
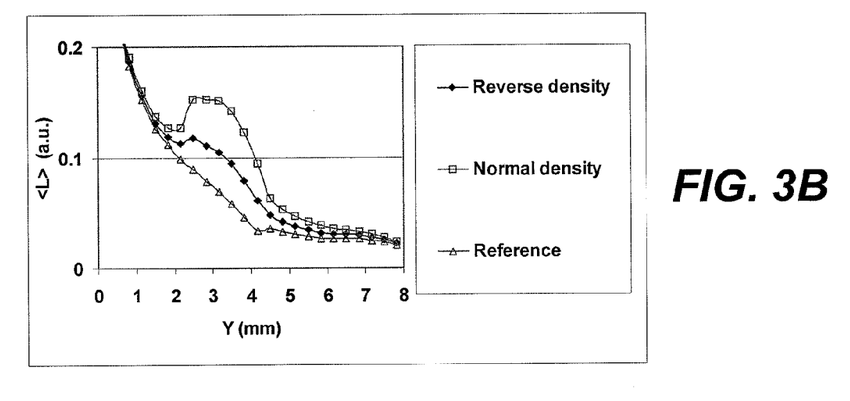
FIG. 3B shows a comparison of the average of the simulated light flux among an inventive example and two comparative examples.

FIG. 3A shows the comparison of the simulated hot spot ratio $L_1/L_0$ vs. Y for different light guide plates. FIG. 3B shows the comparison of the simulated the average of emitted flux <L> vs. Y for different light guide plates. The average of emitted light flux <L> is emitted light flux averaged over the pitch $P_0$ along the X-axis. All of the light guide plates have lenticular lenses on the output surface with a height H=11 µm and radius R=39.9 µm. The lenses 100 in the core zone have a size S1 of 66 µm and a density D1=4%. The mixing zone length is $Y_1$=4 mm. The pitch $P_0$ of the light sources is 6.6 mm.

In FIG. 3A the curve labeled as "Reference" corresponds to a comparative light guide plate I that has no micro-lenses in the mixing zone. Referring to FIG. 3A and the "Reference" curve, the ratio $L_1/L_0$<0.9 for Y<2 mm, indicates a normal hot spot. The ratio $L_1/L_0$>1.1 for Y in the range of about 2 mm and 4 mm, indicates a reverse hot spot. For Y between 4.2 mm and 6.5 mm, $L_1/L_0$<0.9, indicates a normal hot spot.

In FIG. 3A the curve labeled as "Reverse" corresponds to an inventive light guide plate that has a reverse one-dimensional density distribution of micro-lenses 110 in the bottom mixing zone as shown in FIG. 2B. The density of the micro-lenses has a maximum value of 15% at LINE 0, and a minimal value of 0% at LINE 1.

In FIG. 3A the curve labeled as "Normal" corresponds to a comparative light guide plate II that has micro-lenses with a normal one-dimensional distribution in the mixing zone as shown in FIG. 2C. The density of the micro-lenses has a maximum value of 15% at LINE 1, and a minimal value of 0% at LINE 0.

Figure 2D:
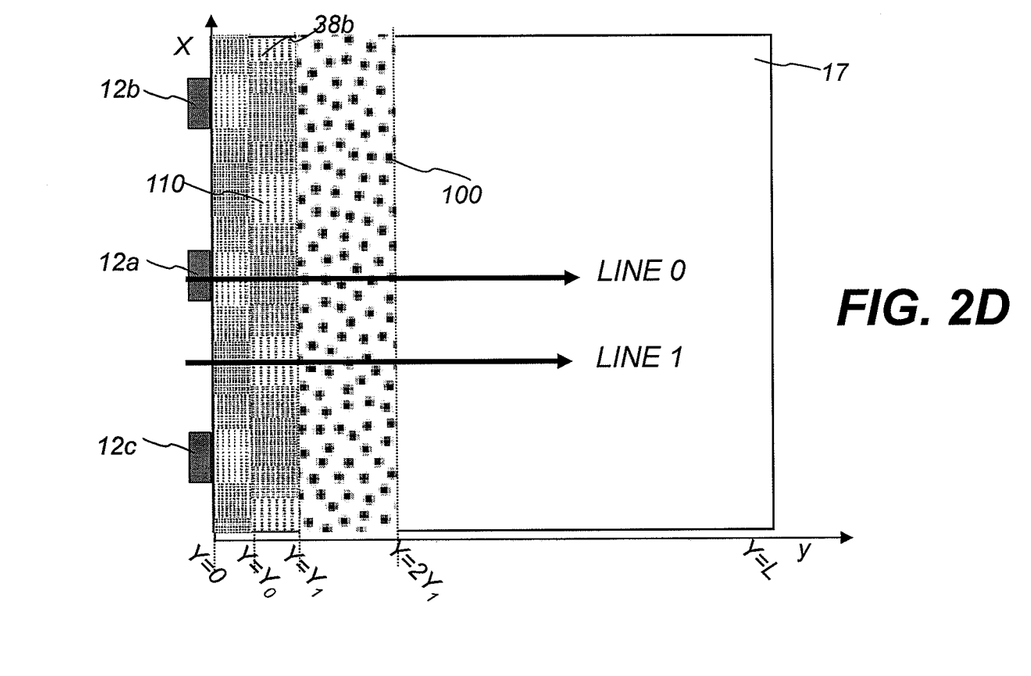
FIG. 2D shows a bottom view of the light guide plate of the present invention; a reversed and a normal micro-lens patterns are distributed in the mixing zone.

FIG. 2D shows another embodiment of the micro-lenses in the bottom mixing zone according to the present invention. In addition to the reverse distribution of the micro-lenses placed between $Y_0$ and $Y_1$, as described in FIG. 2B, additional micro-lenses with a normal distribution are distributed between 0 and $Y_0$.

FIG. 3A shows the simulated hot spot ratio $L_1/L_0$ vs. Y for three light guide plates. The curve labeled as "Reverse density" corresponds to the inventive light guide plate having a reversed one-dimensional distribution of micro-lenses in the bottom mixing zone, shown in FIG. 2B. The curve labeled as "normal density" corresponds to the comparative light guide plate II having a normal one-dimensional distribution of micro-lenses in the mixing zone, shown in FIG. 2C. The curve labeled as "Reference" corresponds to the comparative light guide plate I having no micro-lenses in the mixing zone. All three light guide plates have the same linear lenticular lenses having a height H=11 µm and radius R=39.9 µm on the output surface, have the same mixing zone of 4 mm, and have the same micro-lenses in the core zone where size S1=66 µm and density D1=4%. Both the inventive light guide plate and the comparative light guide plate II have the same micro-lenses in the mixing zone where size S2=40 µm, and an area density where the maximum density is 15% and the minimum density is 0%.

FIG. 3B shows the average of the simulated emitted light flux <L> vs. Y for the same three light guide plates shown in FIG. 3A. The average <L> of the emitted light flux is averaged over a pitch along the X-axis for a given Y, with an arbitrary unit, referred to as "a.u." in FIG. 3B.

FIG. 3A shows that that the reversed one-dimensional micro-lenses in the mixing zone help reduce the hot spot ratio $L_1/L_0$ compared to the reference light guide plate. The normal one-dimensional micro-lenses in the mixing zone also helps reduce the hot spot ratio $L_1/L_0$ compared to the reference light guide plate to some degree. However, the reversed one-dimensional micro-lenses in the mixing zone is preferred over the normal one-dimensional micro-lenses primarily because the average emitted light flux $<L>$ for the reversed micro-lenses is much lower than that for the normal micro-lenses for Y near $Y_1$=4 mm, as shown in FIG. 3B. A higher emitted light flux $<L>$ near $Y_1$=4 mm means higher than unwanted brightness occurs. The higher brightness in the region near $Y_1$=4 mm results in a bright band just inside the viewing area which is undesirable from the customer perspective.

In summary, the density and the size of the micro-lenses 110 in the mixing zone can be selected to suppress the reverse and normal hot spot, though the actual density and the size of the micro-lenses may vary depending on the pitch $P_0$ of the light sources and the geometry of the elongated grooves.

The invention claimed is:

1. A light guide plate having reduced hot spots comprising:
   an input surface for receiving light from a plurality of discrete light sources, an output surface for emitting light, a bottom surface opposing to the output surface, and an end surface opposing to the input surface,
   wherein the direction from the input surface to the end surface is defined as Y-axis, the direction that is perpendicular to the Y-axis and parallel to the discrete light sources is defined as X-axis, the output surface has a plurality of elongated grooves running parallel to the Y-axis and extending from the input surface corresponding to Y=0 to the end surface, the bottom surface has a core zone extending from a predetermined line corresponding to $Y=Y_1$ to the end surface and a mixing zone extending from Y=0 to $Y=Y_1$; and
   a set of lenses are distributed in the core zone and a set of micro-lenses distributed in the mixing zone between $Y=Y_0$ and $Y=Y_1$, wherein the density of the set of micro-lenses varies in the X-axis, having a maximum value at a first location that has a same X value as the center of one of the discrete light sources, and having a minimum value at a second location that has a same X value as the center of two adjacent discrete light sources, and the selected size and the density of the micro-lenses redirect the light from the discrete light sources toward the Y-axis and the ratio $L_1/L_0$ is between 0.9 and 1.1 for any $Y \geq Y_1$; wherein $L_1$ is the light flux along a line that passes midway between the center of two adjacent light sources and $L_0$ is the light flux along a line that passes through the center of a light source.

2. The light guide plate of claim 1, wherein another set of micro-lenses are distributed in the mixing zone between Y=0 and $Y=Y_0$, the density of the another set of micro-lenses varying in the X-axis, having a minimum value at the first location and having a maximum value at the second location.

3. The light guide plate of claim 1, wherein the density of the set of micro-lenses varies in the Y-axis.

4. The light guide plate of claim 1, wherein the density of the set of micro-lenses is constant in the Y-axis.

5. The light guide plate of claim 1, wherein the size of the set of micro-lenses is smaller than that of the set of lenses.

6. The light guide plate of claim 1, wherein the elongated grooves are linear prisms, linear trapezoids, or lenticular lenses.

7. The light guide plate of claim 1, wherein the ratio of the height to size of the elongated grooves is between 0.012 and 0.3298.

* * * * *